United States Patent [19]

Shaffer

[11] 4,049,369
[45] Sept. 20, 1977

[54] PHOTOFLASH LAMP AND MULTILAMP UNIT WITH ELECTROSTATIC PROTECTION

[75] Inventor: John W. Shaffer, Williamsport, Pa.

[73] Assignee: GTE Sylvania Incorporated, Montoursville, Pa.

[21] Appl. No.: 644,351

[22] Filed: Dec. 29, 1975

[51] Int. Cl.² ............................................. F21K 5/02
[52] U.S. Cl. ................................ 431/95 R; 102/28 S; 240/1.3
[58] Field of Search ............... 431/95 R, 95 A, 94, 431/93; 102/28 S; 240/1.3

[56] References Cited

U.S. PATENT DOCUMENTS

| 1,868,224 | 7/1932 | Schürmann | 102/28 S UX |
| 3,816,054 | 6/1974 | Baldrige et al. | 431/95 R |
| 3,873,261 | 3/1975 | Coté | 431/95 R |
| 3,884,615 | 5/1975 | Sobieski | 431/95 R |
| 3,912,442 | 10/1975 | Coté | 431/95 R |
| 3,941,992 | 3/1976 | Blount et al. | 431/95 A X |

Primary Examiner—Edgar W. Geoghegan
Attorney, Agent, or Firm—Edward J. Coleman

[57] ABSTRACT

A high-voltage type photoflash lamp having an ignition structure comprising a mass of primer material bridging a pair of lead-in wires. An insulating sleeve encloses one of the lead-in wires and a fine conductor wire is attached to and projects from the unsleeved lead-in wire to assure contact with filamentary combustible material within the envelope so as to provide electrostatic protection. When mounted in a multilamp unit, each lamp is oriented with the unsleeved lead-in wire connected to a common circuit conductor.

12 Claims, 4 Drawing Figures

PHOTOFLASH LAMP AND MULTILAMP UNIT WITH ELECTROSTATIC PROTECTION

CROSS-REFERENCE TO RELATED APPLICATION

Use of external means for shorting the lead-in wires of a high-voltage type flashlamp to provide electrostatic protection prior to assembly or use is disclosed and claimed in co-pending application Ser. No. 630,581 filed Nov. 10, 1975, now U.S. Pat. No. 4,014,638 issued Mar. 29, 1977 and assigned to the present assignee.

BACKGROUND OF THE INVENTION

This invention relates to photoflash lamps and, more particularly, to flashlamps of the type containing a primer bridge ignited by a high voltage pulse.

High voltage flashlamps may be divided historically into three categories: (1) those having a spark gap within the lamp such that electrical breakdown of a gaseous dielectric (e.g., the combustion-supporting oxygen atmosphere) is an integral part of the lamp ignition mechanism; (2) those having a conductive primer bridge that electrically completes the circuit between the lead-in wires; such primers are rendered conductive by additives such as acetylene black, lead dioxide, or other electrical conduction-promoting agents; and (3) lamps having an essentially nonconducting primer bridge that connects the inner ends of the lead-in wires and which becomes conductive, upon application of a high voltage pulse, by means of breakdown of the dielectric binder separating conductive particles therein.

The earliest high voltage flashlamps were of the spark gap type construction wherein an electrical spark would pass through the gaseous atmosphere within the lamp. The spark would jump between two electrodes, at least one of which was coated with a primer composition. Such lamps tend to exhibit poor sensitivity and reliability when flashed from low power sources such as the miniaturized piezoelectric devices that are suited for incorporating into pocket-sized cameras. Most of the electrical input energy in such lamps is lost to the gas atmosphere by the spark. Also, the electrical characteristics vary considerably from one lamp to another because of shreds of metallic combustible in the spark gap and consequent variations in effective gap length.

The use of spaced lead-in wires interconnected by a quantity of electrically conductive primer gives rise to highly predictable behavior and a well-defined electrical path through the lamp. Here again, however, relatively high-powered flash sources must be used in order to attain reliable lamp flashing.

Present state of the art flashlamps of the high voltage type make use of a bridge of initially nonconducting primer to interconnect the inner ends of the lead-in wires. Considerably higher sensitivity is attainable by this method, apparently because the breakdown and discharge follow a discrete path through the primer composition and thereby promote greater localized heating. With respect to specific construction, such flashlamps typically comprise a tubular glass envelope constricted and tipped off at one end and closed at the other end by a press seal. A pair of lead-in wires pass through the glass press and terminate in an ignition structure including a glass bead, one or more glass sleeves, or a glass reservoir of some type. A mass of primer material contained on the bead, sleeve or reservoir bridges across and contacts the ends of the lead-in wires. Also disposed within the lamp envelope is a quantity of filamentary metallic combustible, such as shredded zirconium or hafnium foil, and a combustion-supporting gas, such as oxygen, at an initial fill pressure of several atmospheres. The outer surface of the lamp envelope is generally covered with a protective reinforcing coating, such as cellulose acetate, applied for example by a lacquer-dipping process.

Lamp functioning is initiated by application of a high voltage pulse (e.g., several hundred to several thousand volts, as, for example, from a piezoelectric crystal) across the lamp lead-in wires. The mass of primer within the lamp then breaks down electrically and ignites; its deflagration, in turn, ignites the shredded combustible which burns actinically.

The primers used in such flashlamps are designed to be highly sensitive toward high-voltage breakdown. Electrical energies as low as a few microjoules are sufficient to promote ignition of such primers and flashing of the lamp. This high sensitivity is needed in order to provide lamps that will function reliably from the compact and inexpensive piezoelectric sources that are practical for incorporation into moder, miniature cameras. The mechanical energy delivered to the piezoelectric crystal and thereby the electrical output energy therefrom is limited both by the size of the device and by the necessity to minimize camera vibration and motion during use.

The high degree of electrical sensitivity needed in high-voltage flashlamps gives rise to distinct problems of inadvertent flashing during their manufacture, lacquer coating, and subsequent handling. Any static charges on equipment or personnel can cause these lamps to flash. Some such lamp flashes even occur when the lamps are lying stationary in an isolated spot. Apparently, even air movements can generate sufficient electrostatic energy to promote flashing of those lamps that are by nature the most sensistive and susceptible. This problem is greatly compounded by the fact that flashlamps flash sympathetically, i.e., the radiant energy from one lamp that flashes is sufficiently intense to ignite the shredded combustible in adjacent lamps. During lamp manufacture on modern high-speed equipment, it is necessary, or at least highly expedient, at certain stages of processing, to accumulate the lamps in containers, having from about 30 to more than 2,000 lamps in a container. The problem that is encountered is that should one lamp be inadvertently ignited, all lamps in that container will sympathetically flash and be lost.

It is common practice in photoflash lamp manufacturing to dip the lacquered lamps into a bath which leaves a film of antistatic agent on their surfaces. This does much to prevent buildup of an electrostatic charge on a lamp itself by rubbing or handling. It does not, however, give a significant protection for the lamp against contact with external charges.

One means of providing the last-mentioned electrostatic protection during manufacture, processing, and handling is described in the above-referenced co-pending application Ser. No. 630,581, wherein the lead-in wires of the lamp comprise the two legs of a hairpin-shaped wire. The bight of the hairpin is disposed outside the envelope and functions to short circuit the lamp prior to use, the bight being cut to enable the lamp when inserted into an assembly.

Another means of providing electrostatic protection in a high-voltage type flashlamp is described in U.S. Pat. No. 3,873,261, wherein a conductive film is coated over the primer mass, or otherwise disposed in contact therewith, and extends to the exposed lead-in wire. In one variation, the conductive film coats a wall portion of the envelope at the base of the lamp. The filamentary combustible in the lamp is supposed to be in contact with the conductive film. I find, however, that this design has a number of shortcomings. Firstly, the conductive film would appear to be somewhat difficult to incorporate in manufacturing. Secondly, it is clear that production lamps would not consistently and reliably exhibit the desired good electrical contact between the filamentary combustible and the conductive film. Typically, one will find in practice that shredded metal foil in the lamps is shifted toward the dome of the envelope and away from the ignition structure. Thirdly, if the primer mass were coated with a conductive film, it is clear that the slightest pinhole in the primer could result in a short-circuiting condition between the inleads at a time when the lamp is supposed to be operational.

Yet another means of providing electrostatic protection in a high-voltage type flashlamp is described in U.S. Pat. No. 3,884,615 of Sobieski. In the basic lamp structure of the Sobieski patent, the two lead-in wires of the ignition mount are sealed into a doughnut-shaped glass bead which is open at both ends. The central opening in the bead is filled with a mass of primer material which bridges the lead-in wires. This construction uses the bead as a shield to keep the filamentary combustible material away from the bare lead-in wires below the bead. FIG. 4 of the Sobieski patent describes a modification in which one of the lead-in wires extends completely through the glass bead and projects above it so as to be in electrical contact with the filamentary combustible material in the lamp envelope. In this manner, the combustible material can be electrically grounded so as to reduce the possibility of accidental electrostatic flashing of the lamp. This design approach, however, also has a number of drawbacks. Firstly, the use of an ignition structure having a protruding lead-in wire would make primer application considerably more difficult. Whereas the dip method of application is generally preferred for high-volume flashlamp manufacturing, such a process would leave a continuous heavy coating of primer on the projecting lead-in wire. Consequently, a follow-up primer removal operation would be required, at added cost, in order to provide clean metal surfaces for making the desired electrical contact with the filamentary combustible material. In order to avoid the secondary wire cleaning step, the primer would have to be applied by the less desirable method of using a syringe or by daubing. A second disadvantage of the projecting lead-in wire is that the resulting higher total wire mass in the lamp imposes a significant reduction in light output. Thirdly, as both lead-in wires are disposed within a single opening in the glass bead and separated only by primer material, post-flash short circuiting can be caused by a possible welding of the lead-in wires within the bead after ignition.

SUMMARY OF THE INVENTION

In view of the foregoing, it is an object of this invention to provide an improved high-voltage type photoflash lamp with means for reliably rendering the lamp more resistant toward inadvertent flashing caused by electrostatic discharges.

A further object is to provide conveniently incorporated electrostatic protection for a high-voltage type flashlamp without adversely affecting other operational parameters of the lamp.

Yet another object is to provide a photoflash unit containing a plurality of high-voltage type flashlamps which are more resistant to inadvertent flashing caused by electrostatic discharges.

These and other objects, advantages and features are attained in accordance with the principles of this invention, by providing a fine gauge conductor wire within the lamp envelope which is electrically connected, such as by welding, to one of the lead-in wires and projects towards the opposite end of the envelope to assure contact with the metallic combustible material in filamentary form contained therein. In this manner, the metallic combustible material is reliably connected electrically to one of the lead-in wires to thereby reduce the susceptibility of the lamp to inadvertent ignition from electrostatic discharges. Prior to use or assembly of the lamp into a photoflash unit, this electrostatic protection is particularly facilitated by additionally providing means outside of the lamp envelope which electrically interconnects the external portions of the lamp lead-in wires to effect a short circuit thereacross. Accordingly, the two measures complement and cooperate with one another in that the external short prevents inadvertent discharges through the primer mass between the two ends of the lead-in wires, while the projecting conductor means electrically shorts the metallic combustible material to both lead-in wires (in view of the external short) to prevent inadvertent discharges through the primer mass between the filamentary metallic combustible and either one of the lead-in wires.

Preferably, the projecting conductor wire has a diameter less than the diameter of the lead-in wire to which it is connected. A wire of 0.006 inch diameter or less is preferred for at least two reasons. After primer application, typically by dipping, such a fine gauge wire will tend not to acquire a continuous coating of primer material, thus avoiding a cleaning operation. Further, use of a very fine wire minimizes the total wire mass in the lamp, thereby minimizing any light output penalty incurred by the added metal; use of a fine wire also minimizes the increased oxygen pressure required to promote burndown of the lead-in and conductor wires for prevention of post-flash short circuits.

According to a preferred embodiment of the invention, the ignition structure includes first and second lead-in wires extending into one end of the lamp envelope in a spaced relationship. A sleeve of insulating material, such as glass, extends within the envelope about the first lead-in wire, with the sleeve being sealed to the envelope at one end and exposing the termination of the first lead-in wire at the other end. The second lead-in wire is disposed outside of the insulating sleeve and terminates at or near the end of the sleeve exposing the other wire termination. A mass of primer material is disposed to substantially cover the end of the sleeve so as to bridge the terminations of the lead-in wires. In this particular ignition structure, the fine gauge, projecting conductor wire is attached to the second lead-in wire, that is, the wire which is disposed outside of the sleeve. In this manner, the first and second lead-in wires are isolated from each other, and the projecting conductor wire is well separated from the sleeved lead-in wire so as to prevent the formation of weld joint between the two lead-in wires resulting from wire burn down during ignition. Hence, the construction is effective in avoiding post-flash short-circuiting.

Electrostatic protection is further enhanced, in accordance with the invention, by employing oriented mounting of the above-described flashlamps in a multi-lamp photoflash unit. More specifically, in a multilamp unit having circuit means for sequentially igniting the flashlamps which includes a group of pairs of flashlamp contact areas and a common circuit conductor connected electrically with one contact area of each of the pairs thereof, each of th flashlamps is electrically connected by their first and second lead-in wires to a respective pair of the contact areas and is oriented with the second lead-in wire of each lamp connected via its contact area to the common circuit conductor. Hence, as the fine gauge projecting conductor wire is each lamp is attached to the second lead-in wire of the lamp, the filamentary combustible material in each of the lamps is electrically connected to the common circuit conductor of the multilamp unit, to thereby reduce the susceptability of the lamps to inadvertent ignition from electrostatic discharges. According to a preferred embodiment, the above-mentioned circuit means comprises a printed circuit board having circuitry on a surface thereof and a connector tab depending therefrom. The plurality of flashlamps are arranged on the circuit board in a planar array, and a plurality of reflectors are respectively associated with the flashlamps and positioned between the lamps and the circuit board. To provide additional electrostatic protection, the reflectors have a metallic surface which is electrically connected to the common circuit conductor on the circuit board. The unit may further include a conductive shield of planar configuration disposed parallel to the plane of the circuit board on the side opposite the surface on which the lamps are mounted and electrically connected to the common circuit conductor.

BRIEF DESCRIPTION OF THE DRAWINGS

This invention will be more fully described hereinafter in conjunction with the accompanying drawings in which.

DESCRIPTION OF PREFERRED EMBODIMENT

Figure 1:
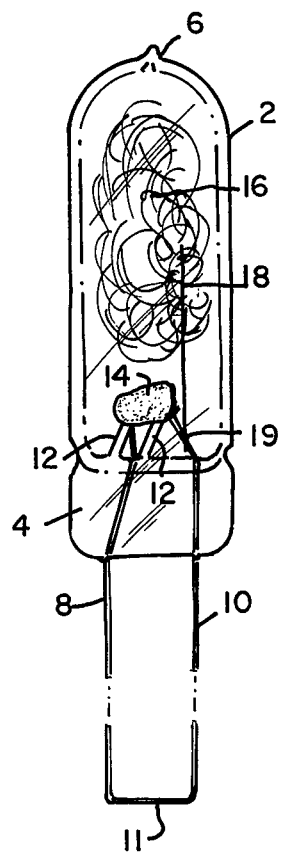
FIG. 1 is an elevational view of a photoflash lamp having an internal projecting conductor wire in accordance with the invention.

Referring to FIG. 1, the high-voltage type flashlamp illustrated therein comprises an hermetically sealed light-transmitting envelope 2 of a glass tubing having a press 4 defining one end thereof and an exhaust tip 6 defining the other end thereof. Supported by the press 4 is an ignition means comprising a pair of lead-in wires 8 and 10 extending through and sealed into the press, an insulating sleeve 12 extending within the envelope about lead-in wire 8, and a mass of primer material 14 bridging the ends of the lead-in wires within the envelope. The insulating sleeve 12 may be formed of glass or ceramic and is preferably sealed into the envelope press 4 at one end so that only the inward end of the sleeve is open. Lead-in wire 10 passes through press 4 and is formed so that it rests and terminates at or near the open end of the sleeve 12. The mass of primer material 14, which may be dip-applied, is disposed to substantially cover the open end of the sleeve 12 and bridge the ends of the lead-in wires.

Typically, the lamp envelope 2 has an internal diameter of less than ½ inch and an internal volume of less than 1 cc. A quantity of filamentary metallic combustible fill material 16, such as shredded zirconium or hafnium foil, is disposed within the lamp envelope. The envelope 2 is also provided with a filling of combustion-supporting gas, such as oxygen, at a pressure of several atmospheres. Typically, the exterior surface of the glass envelope 2 is also provided with a protective lacquer coating, such as cellulose acetate (not shown).

As mentioned hereinbefore, referring to co-pending application Ser. No. 630,581, it has been found that a significant improvement in the resistance of high-voltage type flashlamps toward inadvertent ignition due to contact with external charges can be attained by manufacturing such lamps in a way that provides an electrical connection between the external ends of the lead-in wires. This may be done, for example, by fabricating the lead-in wires from a single hairpin and leaving the bight 11 to electrically interconnect lead-in wires 8 and 10. This bight, or loop, 11 effects a short circuit across the wires and apparently provides its protective function by preventing voltage differentials across the two wires, which in turn prevents firing of the primer bridge by electrical discharges through it from one lead-in wire to the other. In effect, the loop 11 disables the lamp.

If such lamps are to be flashed individually, the protective loop could remain in place until the lamp is, for example, pulled out of the package; a cut partially through each lead-in wire would then permit breakoff (represented by the dashed lines) and enabling of that lamp. If such lamps are to be mounted in multilamp units such as flash cubes or flash arrays, then the cutting of the loop would be the last lamp operation to take place before actual lamp insertion into the device.

In accordance with the present invention, it has been found that a further significant reduction in susceptibility toward electrostatic-caused inadvertent ignitions can be attained through the provision of improved means of electrically connecting the shredded metalic combustible 16 to one of the lead-in wires. A preferred and readily automatable means of accomplishing this is the attachment of a length of fine gauge conductor wire 18 to the unsleeved lead-in wire 10 such that it projects into the upper volume of the lamp vessel so as to assure contact with the shredded combustible 16. This attachment may be accomplished, for example, by swaging, spot welding, or other known means. For example, in the drawing, conductor 18, which may comprise a fine tungsten wire, is attached at joint 19 to lead-in wire 10.

In a high volume flashlamp production, it is generally preferred to apply the ignition primer by a dipping process. During such a process, of course projecting wire 18 will be immersed in the primer slurry. A follow-up primer removal operation may be used to clean wire 18, such as by using a water-based primer composition and promoting electrolytic removal of the unwanted coating as described in U.S. Pat. No. 3,699,021. However, even in the absence of such a secondary cleaning operation, it is found that significant—although somewhat reduced—electrostatic protection is afforded by the shred-contacting wire 18. This behavior has been attributed to the fact that a thin wire (of, e.g., 0.006 inch diameter or less) does not acquire a continuous heavy primer coating but rather shows a very thin coating with isolated beads distributed along the wire length. Effective shred contact is deemed to occur at those sections between the beads that are nearly free of primer.

Preferably, the envelope 2 is provided with a filling of combustion-supporting gas, such as oxygen, in an amount in excess of the quantity required for stoichiometric chemical reaction with the combustible material 16. More specifically, the excess of fill gas is sufficient so that, upon flashing of the lamp the combustible material 16 is completely consumed and the conductor wire 18 and unsleeved lead-in wire 10 within the lamp are sufficiently burned back away from sleeve 12 so as to eliminate any chance of post-flash short circuiting. The length of the external surface of sleeve 12 renders innocuous the effect of any shred droplets that adhere thereto. Hence, the use of a length of fine wire as conductor 18 is favored over, say, mere extension of a lead-in wire, as more oxygen fill pressure would be needed to promote lead-in wire burndown for prevention of post-flash short circuits. The higher oxygen pressure would render lamp containment more difficult. In addition, a fine wire, having a diameter less than the diameter of the connected lead-in wire, is preferred because of the light output penalty incurred with higher total wire mass in the lamp.

As discussed hereinbefore, conductor wire 18 provides electrostatic protection by reliably assuring contact with the metallic shreds 16 regardless of the typical shifts or variations in shred-mass position over production quantities. This, in turn, reliably assures electrical connection between the metallic shred mass 16 and lead-in wire 10. The resulting short circuit between the shred mass 16 and lead-in wire 10 apparently provides its protective function by preventing voltage differentials across the shred mass and wire 10, which in turn prevents firing of the primer bridge by electrical discharges through it from the shred mass to the lead-in wire 10. If hairpin bight 11 is included, the same conditions apply with respect to the primer path between shred mass 16 and lead-in wire 8. This latter arrangement provides a high degree of protection during lamp manufacture and handling prior to use or assembly. Even after the bight 11 is cut off and the lamp is assembled in a photoflash array unit, however, conductor wire 18 can continue to provide a high degree of electrostatic protection against inadvertent ignition, especially if the lamp is oriented with lead-in wire 10 connected to the common circuit of the array and lead-in wire 8 connected to a "floating" terminal of the "hot" side of the array circuitry. In this manner, the susceptible shred mass 16 and exposed lead-in wire 10 are jointly "grounded", and only the shielded lead-in wire 8 is "floating."

Figure 2:
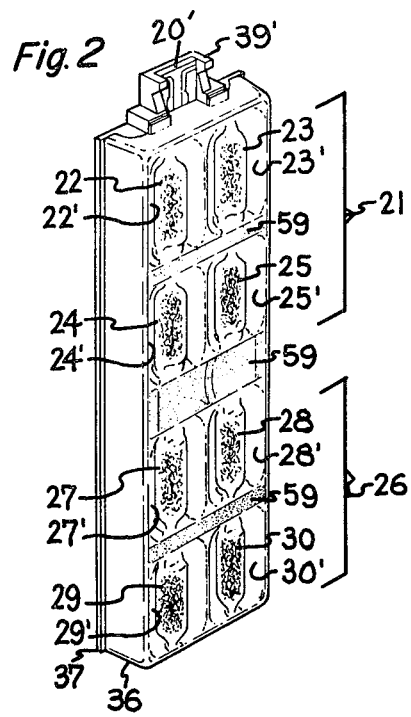
FIG. 2 is a perspective view of a multilamp photoflash unit in accordance with the invention.
Figure 3:
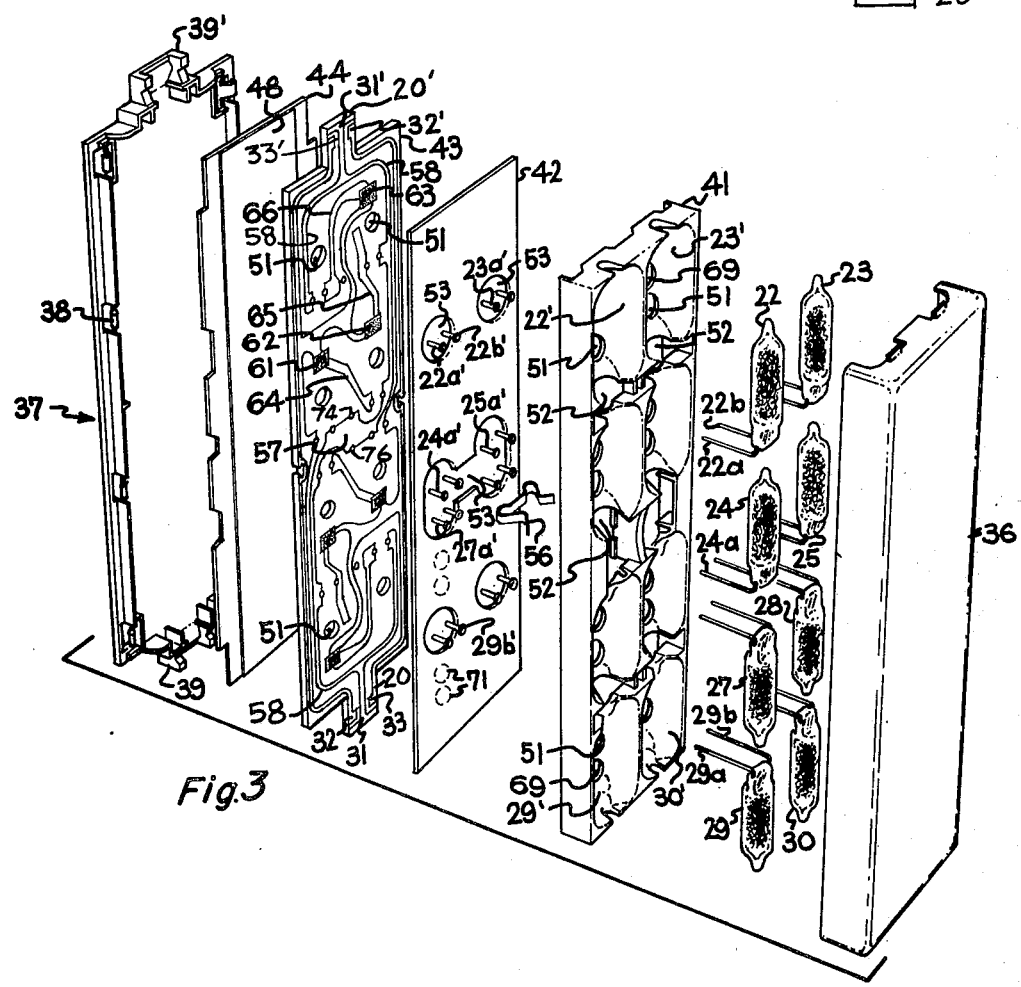
FIG. 3 is an exploded view of the lamp unit of FIG. 2 showing the internal parts.

For example, the above-mentioned concepts of the present invention are particularly useful as embodied in a multilamp photoflash array unit similar to the type described in U.S. Pat. No. 3,894,226 and referred to as a flip flash. As illustrated in FIGS. 2 and 3, this multilamp unit is of the planar array type which contains a plurality of electrically fired flashlamps and is provided with a plug-in connector tab 20 at the lower side or end thereof, adapted to fit into a socket of a camera or flash adaptor. The unit is provided with a second plug-in connector tab 20' at the topside or end thereof, whereby the array unit is adapted to be attached to the camera socket in either of two orientations, i.e., with either the tab 20 or the tab 20' plugged into the socket. The array is provided with an upper group 21 of flashlamps 22, 23, 24 and 25, and a lower group 26 of flashlamps 27, 28, 29 and 30, the lamps being arranged in a planar configuration. Reflectors 22', etc., are disposed behind their respective flashlamps so that as each lamp is flashed, its light is projected forwardly of the array. The lamps are arranged and connected so that when the array is connected to a camera by the connector 20, only the upper group 21 of lamps will be flashed, and when the array is turned end for end and connected to the camera by the other connector 20', only the then upper group 26 of lamps will be flashed. By this arrangement, only lamps relatively far from the camera lens axis are flashable, thus reducing the undesirable red-eye effect.

The construction of the array comprises front and back housing members 36 and 37 which preferably are made of plastic and are provided with interlocking members 38 which can be molded integrally with the housing members and which lock the housing members together in final assembly to form a unitary flash array structure. In the preferred embodiment, the front housing member 36 is a rectangular concavity and the back housing member 37 is substantially flat and includes integral extensions 39 and 39' at the ends thereof which partly surround and protect the connector tabs 20 and 20' and also function to facilitate mechanical attachment to the camera socket. Sandwiched between the front and back housing members 36 and 37, in the order named, are the flashlamps 22, etc., an electrically conductive unitary reflector member 41 (preferably of aluminum-coated plastic) shaped to provide the individual reflectors 22', etc., an electrically insulating sheet 42, a printed circuit board 43 provided with integral connector tabs 20 and 20', and an indicia sheet 44 which may be provided with information and trademarks, and other indicia such as flash indicators (not shown) located behind the respective lamps and which change color due to heat and/or light radiation from a flashing lamp, thus indicating at a glance which of the lamps have been flashed and not flashed.

The indica sheet 44 may be of paper or thin cardboard and provided with openings (not shown) where the flash indicators are desired, and flash indicator material, such as a sheet-like heat sensitive plastic material, for example biaxially oriented polypropylene, which shrinks or melts when subjected to heat or radiant energy from an adjacent flashing lamp, thus effectively changing the color of the openings in the inidica sheet 44. A single flash indicator sheet 48 may be arranged over all of the flash indicator openings. Openings 51 are provided through the reflector unit 41 and the circuit board 43 to facilitate radiation from the flashing lamps reaching the flash indicators. The rear housing member 37 is transparent (either of clear material or provided with window openings) to permit viewing of the indicia on the indicia sheet 44. The front housing member 36 is transparent at least in front of the lamps 22, etc., to permit light from the flashing lamps to emerge forwardly of the array, and may be tinted to alter the color of the lights from the flashlamps.

The height and width of the rectangular array are substantially greater than its thickness, and the height and width of the reflector member 41, insulating sheet 42 and circuit board 43 are substantially the same as the interior height and width of the housing member 36 to facilitate holding the parts in place.

The tab 20, which is integral with the circuit board 43, is provided with a pair of electrical terminals 31 and 32, and similarly the tab 20' is provided with a pair of terminals 31' and 32', for contacting terminals of a camera socket for applying firing voltage pulses to the array. Each tab is provided with a third terminal 33 and 33', respectively, which functions to electrically short the circuitry of the inactive lower group of lamps, when the array is plugged into a socket. The terminals 31 and 31' are shown as having a lateral "T-bar" configuration for temporarily shorting the socket terminals while the array is being plugged in, to discharge any residual voltage charge in the firing pulse source and also to reduce the likelihood of the lamps being accidentally flashed by electrostatic voltage when the array is handled.

The circuit board 43 has a printed circuit thereon, as will be described, for causing sequential flashing of the lamps, by firing voltage pulses applied to the terminals 31, 32 or 31', 32'. The top and bottom halves of the printed circuitry preferably are reversed mirror images of each other. The lead-in wires 22a, 22b, etc., of the lamps 22, etc., may be attached to the circuit board 43 in various ways, such as by means of metal eyelets 22a', 22b', etc., placed through openings in the board. The lead-in wires 22a, 22b, etc., pass through openings 53 in the insulating sheet 42, and into or through the respective pairs of eyelets 22a', 22b', etc., and the ends of the eyelets are crimped or bent to hold the lead wires and make electrical contact thereto and also to hold the eyelets in place with their heads in electrical contact with the circuit of the circuit board. A metal clip 56 is clipped onto the reflector member 41, which reflector is preferably made of metal-coated plastic, and the rear of the clip 56 rests in touching contact against an area 57 of an electrical ground circuit comprising a continuous conductor-run 58 on the board and which includes, or is connected to, the terminals 31 and 31' and which is connected in common and makes contact with one of each of the pairs of connector eyelets for each of the lamps 22, etc., whereby the reflector unit 41 additionally functions as an electrically grounded shield. More specifically, in the upper half of the circuit board, the common circuit conductor 58 is connected electrically with a respective contact area of the eyelets 22a', 23b', 24b', and 25b'.

Areas 59 on the transparent front housing member 36 may be made opaque or partly opaque, such as by making the surface roughened at these areas, to fully or partially conceal the lamp lead-in wires 22a, 22b, etc., and/or the lower portions of the lamps, for improved appearance of the array.

The circuit board terminal 32 is part of a conductor run that is electrically connected to lead-in wire 24a of lamp 24 at the eyelet 24a' and terminates at radiation switches 61, 62 and 63 respectively positioned near lamps 24, 25, and 23. A circuit board conductor run 64 is connected electrically to the remaining lead-in wire of flashlamp 25 at eyelet 25a' and terminates at the radiation switch 61. A circuit board conductor run 65 is connected to the remaining lead-in wire of flashlamp 23 at eyelet 23a' and terminates at the radiation switch 62. Similarly, a circuit board conductor run 66 is connected to the remaining lead-in wire of flashlamp 22 at eyelet 22b' and terminates at radiation switch 63.

The radiation switches 61, 62 and 63 respectively are in contact with and bridge across the circuit run that are connected to them. The material for the radiation switches may be suitable material initially having an open circuit or high resistance, the resistance thereof becoming zero or of a low value when the material receives radiation in the form of heat and/or light from a respective adjacent lamp upon the lamp being flashed. For this purpose, each of the radiation switches is respectively positioned behind and near to a flashlamp 24, 25, 23. Windows in th form of transparent sections or openings 69 may be provided in the reflectors in front of the switches as shown in FIG. 3 to facilitate radiation transfer. A suitable material for the radiation switches is silver oxide dispersed in a binder such as polyvinyl resin. Each of these radiation switches, upon receiving heat and/or light radiation from the adjacent lamp when it is flashed, changes from an open circuit or high resistance to a closed circuit or low resistance between its switch terminals on the circuit board.

As has been explained, the lower portion of the circuit board contains a substantially reverse mirror image of the same circuit shown on the upper part of the circuit board and, therefore, will not be described in detail. It will be noted that the circuit runs from the plugged-in terminals 31 and 32 at the lower part of the circuit board extend upwardly so as to activate the circuitry in the upper half of the circuit board. Similarly, when the unit is turned around the tab 20' is plugged into a socket, the circuit board terminals 31' and 32' will be connected to and activate the lamps which then will be in the upper half of the circuit board, and hence in the upper half of the flash unit. This accomplishes, as has been stated, the desirable characteristic whereby only the group of lamps relatively farthest away from the camera lens axis will be flashed, thereby reducing or eliminating the undesirable red-eye effect.

Figure 4:
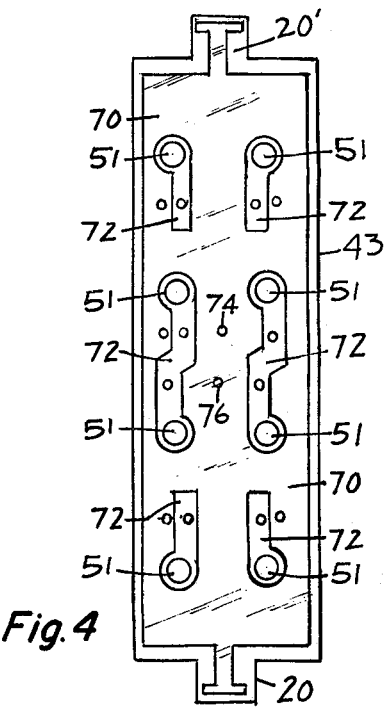
FIG. 4 is an elevational view of the back of the printed circuit board employed in the lamp of FIGS. 2 and 3.

FIG. 4 illustrates yet another electrostatic protective means provided in the flash unit comprising a conductive shield of planar configuration disposed parallel to the plane of the circuit board on the side opposite the surface containing the above-described printed circuitry and electrically connected to the common circuit conductor run. More specifically, a hot-stamped aluminum coating 70 is provided on the rear of the printed circuit board 43, with spaces 72 provided in the areas about the "hot" lead eyelet holes to avoid inadvertent shortcircuiting. The conductive shield coating 70 is electrically connected to the common circuit conductor by means of eyelets (not shown) secured through holes 74 and 76, which thereby provide a direct connection means between the back shield coating 70 and area 57 of the electrical ground circuit run 58 on the front of the board.

In accordance with the present invention, each of the flashlamps 22, etc., is oriented with its lead-in wire 10 (FIG. 1), i.e., the unsleeved lead-in wire to which the projecting conductor wire 18 is attached, electrically connected via a respective eyelet and contact area to the common circuit conductor 58. In this manner, as previously described, the filamentary combustible material in each of the lamps is electrically connected to the common circuit conductor 58 to thereby reduce the susceptability of the lamps to inadvertent ignition from electrostatic discharges. Thus, to be more specific, lead-in wire 10 of FIG. 1 corresponds to the lead-in wires 22a, 23b, 24b and 25b respectively connected to eyelets 22a', 23b', 24b' and 25b' FIG. 3.

In like manner, the sleeved lead-in wire 8 of FIG. 1 corresponds to lamp lead-in wires 22b, 23a, 24a and 25a connected respectively to eyelets 22b', 23a ', 24a', and 25a'. Lead-in wires 22b, 23a and 25a are thus "floating", as they are connected to normally open switches. Lead-in wire 24a is connected to a conductor run which is connected at one end to tab terminal 32 and at its other ends terminates at radiation switches 61, 62 and 63.

An example of a preferred method of making a photoflash unit according to the invention comprises the following steps. First, in the manufacturing of the lamp, the hairpin 8, 11, 10 is shaped, conductor wire 18 is swaged onto lead-in wire 10 and insulating sleeve 12 is inserted over the top portion of lead-in wire 8. The lead-in wires and one end of sleeve 12 are then sealed into the end of a length of glass envelope tubing at the press 4, with the hairpin bight 11 extending outwardly therefrom. A quantity of primer material is dip-applied so as to provide the mass 14 bridging the free ends of the lead-in wires within the envelope tubing. The envelope tubing is then filled with a quantity of filamentary combustible material 16, such as shredded zirconium. The open end of the tubing is then constricted, a combustion-supporting gas such as oxygen is admitted, and the constriction is tipped off to provide an hermtically sealed envelope. A protective lacquer coating is then applied to the exterior of the glass envelope, such as by dipping and drying. All through this process, the lamp leads are interconnected by bight 11, which maintains the lamp in a disabled state for providing electrostatic protection. Just prior to assembly to the lamp mounting means of the photoflash unit, the electrical interconnection (bight 11) is cut to enable the lamp so that it can be fired.

Operation of such enabled high voltage type flashlamps is initiated when a high voltage pulse from, e.g., a piezoelectric crystal, is applied across the two lead-in wires 8 and 10. Electrical breakdown of the primer causes its deflagration which, in turn, ignites the shredded metallic combustible 16.

The circuit on the circuit board 43 of FIG. 3 functions as follows. Assuming that none of the four lamps in the upper half of the unit have been flashed, upon occurrence of a first firing pulse applied across the terminals 31 and 32, this pulse will be directly applied to the lead-in wires of the first connected flashlamp 24, whereupon the lamp 24 flashes and becomes an open circuit between its lead-in wires. Heat and/or light radiation from the flashing first lamp 24 causes the adjacent radiation switch 61 to become a closed circuit (or a low value of resistance), thereby connecting the circuit board terminals 32 electrically to the lead-in wire of the second lamp 25 at eyelet 25a'. By the time this occurs, the firing pulse has diminished to a value insufficient to cause the second lamp 25 to flash. When the next firing pulse occurs, it is applied to the lead-in wires of the second lamp 25, via the now-closed radiation switch 61 whereupon the second lamp 25 flashes, thereby causing radiation switch 62 to assume zero or low resistance, and the second lamp 25 now has an open circuit or high resistance between its lead-in wires. When the next firing pulse occurs, it is applied via now-closed radiation switch 62 to the third lamp 23, thereby firing the lamp which becomes an open circuit, and the radiation from it causes the radiation switch 63 to become essentially a closed circuit across its terminals. Thus, the next firing pulse will be applied via now-closed radiation switch 63, to the lead-in wires of the fourth flashlamp 22, thereupon causing the lamp to flash. Since this lamp is the last lamp in the active circuit, it does not matter whether its lead-in wires are an open or closed circuit after flashing. Additional flashlamps, radiation switches and electrical conductors can be employed, if desired, using the just-described principles. When the flash unit is turned around and the other connector tab 20' attached to the camera socket, the group of lamps that then become uppermost and relatively farthest away from the lens axis will be in an active circuit and will be flashed in the same manner as has been described. in a preferred embodiment, the lamps 22, etc., are high-voltage types, requiring about 2,000 volts, for example, at low current for flashing, and they can be fired by impacting or stressing a piezoelectric element in the camera.

The advantage of this invention is that it reliably provides significant electrostatic protection for high-voltage type flashlamps and multilamp units in a way that is inexpensive and which lends itself readily to automated lamp manufacturing processes. Such protection improves the safety of handling such flashlamps and multilamp units and also greatly reduces the loss of produce due to inadvertent ignitions caused by stray electrostatic charges.

A test which illustrates the concepts described herein was carried out using 134 lamps of the design shown. The lamps were fabricated from 0.259 inch O.D. type 7052 glass. Lamp internal volume was 0.35 cm.$^3$; pressure was 1150 cm. Hg absolute; zirconium shred weight was 13 mgs. per lamp; and the shred 16 strand dimensions were 4 inches in length and 0.00093 $\times$ 0.0012 inch in cross-section. The shred contacting member 18 comprised a tungsten wire 5/16 long by 0.004 inch in diameter which was spot welded to lead-in wire 10 as shown. The lead-in wires were 0.12 inch dia. Rodar; and the insulating sleeve 12 was type 7052 glass 0.160 inch long, having an O.D. of 0.73 inch and an I.D. of 0.027. inch Approximately 2.5 mgs. of primer was used in each lamp; the primer comprised 99.3 percent by weight zirconium powder and 0.7 percent by weight hydroxyethyl cellulose on a dried basis. The primer was electrolytically removed from the tungsten shred-contacting member 18 using 5 percent sodium chloride dip and a three volt D.C. source. The control lamps were identical except that there was no tungsten shred-contacting member. The lamps of both groups had the lead-in wires externally connected via bight 11 as shown.

The lamps were placed tip down into brass cups of ⅜ inch I.D. and ⅜ inch depth, mounted on a motor-driven turntable. The turntable and cups were electrically grounded. The lamp leads passed under a contactor having a D.C. potential of 6,300 volts.

|  | No. Lamps | No. Flashed | Percent Flashed |
|---|---|---|---|
| Control | 175 | 122 | 69.7 |
| Test | 134 | 10 | 7.5 |

This test shows a more than ninefold reduction in lamp susceptibility toward flashing due to imposed electrical stress along the length of the lamp.

Another test was conducted which illustrates the concepts disclosed herein as applied to the above-described multilamp photoflash array units. The lamps employed in the test and control array units were similar, respectively, to the test and control lamps described in the above lamp test illustration, except that the envelopes were formed of G-1 soft glass. Each test, referred to as a front face electrostatic flash test, comprised the application of a 10,000 volt discharge potential between the "T-bar" terminal 31 (or 31') on the connector tab 18

(or 18′) and a metallic plate positioned against the front surface of the conver, or housing member, 36 of the array in front of the group 21 (or 26) of four lamps associated with that connector. The control units tested employed randomly oriented lamps with no projecting wire 18, whereas the test units contained lamps having the described projecting wire 18 and oriented with lead-in wire 10 connected to the common circuit conductor.

|  | Number Arrays/Lamps | No. Lamps Flashed | Percent Flashed |
|---|---|---|---|
| Control | 4/32 | 6 | 18.8 |
| Test | 12/92* | 1 | 1.1 |

*Note: Four lamps were misoriented; of these, one flashed; not included in above data.

This test shows a very significant reduction in lamp susceptibility toward flashing due to imposed electrical stress when lamps according to the invention are mounted in the array unit in oriented fashion.

Although the invention has been described with respect to a specific embodiment, it will be appreciated that modifications and changes may be made by those skilled in the art without departing from the true spirit and scope of the invention.

What I claim is:

1. A photoflash lamp comprising
an hermetically sealed, light-transmitting envelope;
a quantity of metallic combustible material in filamentary form located within said envelope;
a combustion-supporting gas in said envelope;
and ignition means disposed in said envelope in operative relationship with respect to said filamentary combustible material, said ignition means including a pair of lead-in wires extending into one end of said envelope in a spaced relationship, a mass of primer material bridging said lead-in wires within said envelope, and a conductove wire electrically connected to one of said lead-in wires within said envelope and projecting toward the other end of said envelope to assure contact with said filamentary combustible material, whereby said combustible material is electrically connected to said one of the lead-in wires to thereby reduce the susceptibility of said lamp to inadvertent ignition from electrostatic discharges, said conductor wire having a diameter less than the diameter of the connected lead-in wire.

2. The lamp of claim 1 wherein the diameter of said wire conductor means is not greater than about 0.006 inch.

3. The lamp of claim 1 wherein said ignition means further includes means outside of said envelope electrically interconnecting the external portions of said pair of lead-in wires to effect a short circuit thereacross, whereby the lamp is disabled until ready for assembly or use.

4. The lamp of claim 3 wherein said pair of lead-in wires comprise the two legs of a generally hairpin-shaped wire, and said short circuit means comprises the bight of said hairpin-shaped wire.

5. A photoflash lamp comprising:
an hermetically sealed, light-transmitting envelope;
a quantity of metallic combustible material in filamentary form located within said envelope;
a combustion-supporting gas in said envelope;
an ignition means disposed in said envelope in operative relationship with respect to said filamentary combustible material, said ignition means including first and second lead-in wires extending into one end of said envelope in a spaced relationship, a sleeve of insulating material extending within said envelope about said first lead-in wire, said sleeve being sealed to said envelope at one end and exposing the termination of said first lead-in wire at the other end, said second lead-in wire being outside of said sleeve and terminating at or near said other end of said sleeve, a mass of primer material disposed to substantially cover said other end of the sleeve and bridge the terminations of said lead-in wires, and conductor means attached to and electrically connected with said second lead-in wire within said envelope and projecting toward the other end of said envelope to assure contact with said filamentary combustible material, whereby said combustible material is electrically connected to said second lead-in wire to thereby reduce susceptibility of said lamp to inadvertent ignition from electrostatic discharges, said conductor means being a metal wire having a diameter less than the diameter of said second lead-in wire.

6. The lamp of claim 5 wherein the diameter of said wire conductor means is not greater than about 0.006 inch.

7. The lamp of claim 5 wherein said ignition means further includes means outside of said envelope electrically interconnecting the external portions of said first and second lead-in wires to effect a short circuit thereacross, whereby the lamp is disabled until ready for assembly or use.

8. The lamp of claim 7 wherein said first and second lead-in wires comprise the two legs of a generally hairpin-shaped wire, and said short circuit means comprises the bight of said hairpin-shaped wire.

9. A multilamp photoflash unit containing a plurality of flashlamps and circuit means for sequentially igniting said flashlamps; said circuit means including a group of pairs of flashlamp contact areas and a common circuit conductor connected electrically with one contact area of each of said pairs thereof; each of said flashlamps comprising: an hermetically sealed, light-transmitting envelope; a quantity of metallic combustible material in filamentary form located within said envelope; a combustion-supporting gas in said envelope; and ignition means disposed in said envelope in operative relationship with respect to said filamentary combustible material, said ignition means including first and second lead-in wires extending into one end of said envelope in a spaced relationship, a sleeve of insulating material extending within said envelope about said first lead-in wire, said sleeve being sealed to said envelope at one end and exposing the termination of said first lead-in wire at the other end, said second lead-in wire being outside of said sleeve and terminating at or near said other end of said sleeve, a mass of primer material disposed to substatially cover said other end of the sleeve and bridge the terminations of said lead-in wires, and conductor means attached to and electrically connected with said second lead-in wire within said envelope and projecting toward the other end of said envelope to assure contact with said filamentary combustible material; and each of said flashlamps being electrically connected by the first and second lead-in wires thereof to a respective pair of said contact areas and being oriented with said second lead-in wire electrically connected via a contact area to said common circuit conductor, whereby the filamentary combustible material in each of said lamps is electrically connected to said common circuit conductor to thereby reduce the suceptibility of said lamps to inadvertent ignition from electrostatic discharges.

10. The unit of claim 9 wherein said circuit means comprises a printed circuit board having circuit on a surface thereof and a connectortab depending therefrom with first and second terminals thereon, said plurality of flashlamps are arranged on said circuit board in a planar array, said common circuit conductor is disposed on said circuit board surface and electrically connected to the first terminal of said tab connector and further including switching circuitry on said circuit board surface connecting the second terminal of said tab connector with said contact areas connected to the first lead-in wires of said flashlamps.

11. The unit of claim 10 wherein said flashlamps are positioned over said surface of said circuit board, and further including a plurality of reflectors respectively associated with said flashlamps and positioned between said lamps and said circuit board, said reflectors having a metallic surface which is electrically connected to said common circuit conductor.

12. The unit of claim 11 further including a conductive shield of planar configuration disposed parallel to the plane of said circuit board on the side opposite said surfaCE thereof and electrically connected to said common circuit conductor.

* * * * *